Feb. 15, 1927.
E. H. MERRITT
LATHE
Filed Aug. 14, 1926
1,617,409
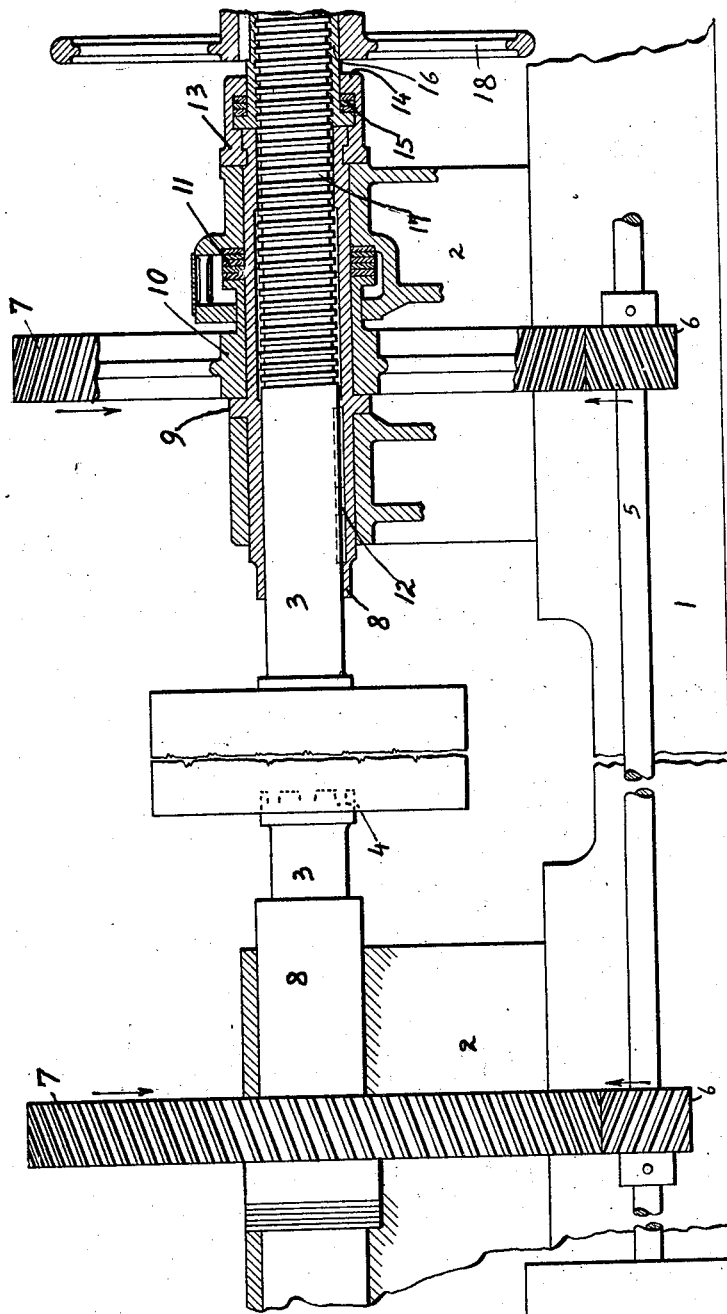
INVENTOR.
Ericsson H. Merritt
BY Mayer, Warfield & Watson
ATTORNEYS.

Patented Feb. 15, 1927.

1,617,409

UNITED STATES PATENT OFFICE.

ERICSSON H. MERRITT, OF LOCKPORT, NEW YORK, ASSIGNOR TO MERRITT ENGINEERING & SALES COMPANY, INC., OF LOCKPORT, NEW YORK, A CORPORATION OF NEW YORK.

LATHE.

Application filed August 14, 1926. Serial No. 129,136.

This invention relates to improvements in lathes and while it may be employed to advantage in numerous connections, it is primarily intended for use in veneer lathes of the type shown, for example in the Louis G. Merritt Patent 699,547, dated May 6, 1902.

It is an object of the invention to construct a device of this character, which will operate over long periods of time, with freedom from mechanical difficulty and in which the mechanism will offer a minimum operating resistance.

A further object of the invention is to provide a machine of this nature in which stresses will be equalized to a great extent and the bearings will be largely relieved of friction and wear.

A still further object of the invention is to provide a lathe in which the foregoing objects are achieved by means of a relatively simple construction and with the use of a number of parts substantially equal to those at present employed in machines of this character.

Other objects of the invention will in part be obvious and will in part appear hereinafter.

The invention accordingly comprises the features of construction, combination of elements and arrangement of parts which will be exemplified in the construction hereinafter set forth, and the scope of the application of which will be indicated in the claims.

For a fuller understanding of the nature and objects of the invention reference should be had to the following detailed description taken in connection with the accompanying drawing in which:

The figure is a partly sectional side elevation of one form of lathe embodying the present invention.

In this view the numeral 1 indicates the base of the lathe which is provided with head or end portions 2 each rotatably supporting a spindle 3 carrying at its inner end a chuck member 4.

A drive shaft 5 is employed extending longitudinally of the base 1 and carrying pinions 6 adjacent the heads 2. These pinions mesh with gears 7. It will be noted that the pinions and gears are of the helical or spiral tooth type and that the teeth of each pair are opposed and that the teeth of a pair adjacent one end of the base are opposed to the teeth of the pair adjacent the opposite end thereof. As a consequence, if the parts are rotated in the direction indicated by the arrows, it will be perceived that due to the inability of the pinions to move axially the gears 7, in addition to turning tend to move axially towards each other, incident to the inclination of their teeth and the cooperation thereof with the teeth of the adjacent pinions.

The spindles are connected one to each of the gears 7. This connection is preferably established by the use of sleeves 8 which encircle the spindles and are formed with annular shoulders 9 bearing against the inner face of the adjacent gear hubs 10, the hubs of each gear being extended and engaging the outer element of a thrust-bearing 11, the inner element of which bears against a portion of the head 2. The sleeve 8 is keyed to the spindle as at 12 and has an annular groove formed in its rear end, which groove is engaged by the inwardly extending edge of a collar 13. The opposite end of the collar is extended inwardly as at 14 beyond the inner end of the sleeve 8 and a thrust-bearing 15 is interposed between the outer end of the collar and a flanged portion of a chucking sleeve 16 which is interiorly screw threaded to engage corresponding threads 17 forming a part of the adjacent spindle 3, this sleeve having a chucking-wheel or gear 18 secured to its body.

In operation, it will be understood that when the gears 7 are rotated they will rotate the sleeves 8 and spindles 3 and any thrust upon the latter will be transmitted to the gears and the thrust-bearings 11 through the chucking sleeves 16, bearings 15, collars 13, and sleeves 8 acting upon the hub portions of the gears through the flanges 9.

These chucking strains occur when the log or other article operated upon is engaged by the chuck member 4, which action will result upon the wheel or gear 18 being turned to axially feed the spindles inwardly. This action would normally transmit all thrust to the bearings.

By the construction described, however, the axial strains incident to chucking and driving are opposed in direction and tend to neutralize or offset each other, and due to the type of gears and pinions employed and the disposition of these elements it will be appreciated that a great amount of the thrust which would ordinarily be directly transmitted to the bearings 11 will be absorbed by the interengaging teeth of these pinions and gears.

Thus, among others, the objects specifically aforementioned are accomplished, and since it is intended that certain changes may be made in the above construction, and different embodiments of the invention could be made, without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which as a matter of language might be said to fall therebetween.

Having described my invention, what I claim as new and desire to secure by Letters Patent is:

1. In a veneer lathe, in combination, a spindle axially adjustable for chucking and rotatable for driving, a thrust-bearing for said spindle, a gear connected to said spindle for rotating the same, and a gear fixed on a drive shaft and meshing with said first gear to drive the latter, said gears having angular teeth cooperating to relieve the thrust on said bearing.

2. In a veneer lathe, in combination, a pair of opposed spindles axially adjustable for chucking and rotatable for driving, thrust-bearing for each of said spindles and preventing axial outward movement thereof, gears connected to each of said spindles for rotating the same, and further gears meshing with said first gears to drive the latter, said gears having angular teeth cooperating to urge said spindles inwardly and relieve the thrust on said bearings.

3. In a veneer lathe, in combination, a pair of opposed spindles axially adjustable for chucking and rotatable for driving, thrust-bearing for each of said spindles and preventing axial outward movement thereof, gears connected to each of said spindles for rotating the same, a single drive shaft and a pair of gears fixed on said shaft and meshing one with each of said first gears to drive the latter, said gears having angular teeth cooperating to urge said spindles axially inward to relieve the thrust on said bearings.

4. In a veneer lathe, in combination, a spindle, means for adjusting said spindle axially, means for rotating said spindle, means for connecting said adjusting means with said rotating means, a thrust-bearing for the latter, a gear forming a part of said spindle rotating means and a second gear fixed on a drive shaft and meshing with said first gear to drive the latter, said gears having angular teeth cooperating to relieve the thrust on said bearing.

5. In a veneer lathe, in combination, a spindle, means for axially adjusting said spindle for chucking operations, a sleeve connected with said spindle to rotate the same, a thrust bearing cooperating with said sleeve and acting to resist end thrust of said spindle, means for connecting said adjusting means with said sleeve, a gear connected with said sleeve to rotate the same and said spindle, and a second gear fixed to a drive shaft and meshing with said first gear to drive the latter, said gears having angular teeth cooperating to relieve the thrust on said bearing.

6. A lathe, including a pair of opposed spindles axially adjustable for chucking and rotatable for driving, bearings for said spindles, and preventing axially outward movement thereof, driving gears connected one to each of said spindles and prevented from axially inward movement with respect thereto, further gears for driving said first named gears and means for retaining said second gears against axial movement, the teeth of each pair of cooperating gears being angularly disposed and opposed to each other, the teeth of the different pairs of gears being also opposed with respect to each other and arranged to urge said first-named gears axially inward to relieve the thrust upon said bearings.

In testimony whereof I affix my signature.

ERICSSON H. MERRITT.